United States Patent
Zhang et al.

(10) Patent No.: US 6,698,278 B2
(45) Date of Patent: Mar. 2, 2004

(54) INDIRECT MEASUREMENT OF FUEL CONCENTRATION IN A LIQUID FEED FUEL CELL

(75) Inventors: Jiujun Zhang, Richmond (CA); Kevin M. Colbow, North Vancouver (CA); Alfred Wong, Vancouver (CA); Bruce Lin, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 103 days.

(21) Appl. No.: 10/033,758

(22) Filed: Dec. 19, 2001

(65) Prior Publication Data

US 2003/0110841 A1 Jun. 19, 2003

(51) Int. Cl.$^7$ .................. G01N 25/00; G01N 33/22; H01M 8/00; H01M 8/04
(52) U.S. Cl. .................. 73/61.76; 73/61.41; 429/12; 429/13; 429/23; 429/24
(58) Field of Search .............................. 73/61.41, 61.76; 429/12, 13, 19, 22, 23, 24

(56) References Cited

U.S. PATENT DOCUMENTS

| | | | |
|---|---|---|---|
| 4,810,597 A | | 3/1989 | Kumagai et al. |
| 5,196,801 A | | 3/1993 | Nogami et al. |
| 5,624,538 A | | 4/1997 | Luft et al. |
| 5,798,186 A | * | 8/1998 | Fletcher et al. ............. 429/13 |
| 5,853,910 A | * | 12/1998 | Tomioka et al. ............. 429/17 |
| 6,374,166 B1 | * | 4/2002 | Takeda ........................ 429/19 |
| 6,589,679 B1 | | 7/2003 | Acker et al. |

FOREIGN PATENT DOCUMENTS

| | | | | |
|---|---|---|---|---|
| JP | 58-87771 | * | 5/1983 | .............. 429/24 |
| JP | 61-51772 | * | 3/1986 | .............. 429/13 |
| JP | 63-152880 | * | 6/1988 | .............. 429/13 |
| WO | WO 01/13451 | | 2/2001 | |
| WO | WO 01/28021 | | 4/2001 | |
| WO | WO 01/35478 | | 5/2001 | .............. 73/61.41 |

OTHER PUBLICATIONS

"Design and Operation of an Electrochemical Methanol Concentration Sensor for Direct Methanol Fuel Cell Systems", S.R. Narayanan et al., *Electrochemical and Solid-State Letters*, 3 (3) 117–120 (2000).

"Fuel Cell Sensors", W.J. Criddle et al., *Reactive Electrode Rev.*, vol. 14, pp. 195–223, 1995.

"A Methanol Sensor for Portable Direct Methanol Fuel Cell", Scott A. Calabrese Barton et al., *J. Electrochem. Soc.*, vol. 145, No. 11, Nov. 1998.

"Performance of a direct methanol fuel cell", K. Scott et al., *Fourth European Symposium on Electrochemical Engineering*, Prague, Aug. 28–30, 1996.

"Material aspects of the liquid feed direct methanol fuel cell" K. Scott et al.

* cited by examiner

*Primary Examiner*—Daniel S. Larkin
(74) *Attorney, Agent, or Firm*—McAndrews, Held & Malloy, Ltd.

(57) ABSTRACT

In an operating liquid feed fuel cell system, fuel concentration in the fuel stream can be calculated as a function of the observed current, the temperature of the fuel stream entering the fuel cell stack, and the temperature of the fuel cell stack itself, thereby eliminating the need for a separate sensor. Typically, methanol will be used as the fuel and the liquid feed fuel cell system will thus be a direct methanol fuel cell system.

15 Claims, 5 Drawing Sheets

Figure 1

US 6,698,278 B2

INDIRECT MEASUREMENT OF FUEL CONCENTRATION IN A LIQUID FEED FUEL CELL

FIELD OF THE INVENTION

The present invention relates to measuring fuel concentration in a liquid feed fuel cell. More particularly, the invention relates to a method and apparatus for indirectly measuring the concentration of fuel in an operating liquid feed fuel cell system.

BACKGROUND OF THE INVENTION

In general, electrochemical fuel cells convert reactants, namely fuel and oxidants, to generate electric power and reaction products. Electrochemical fuel cells employ an electrolyte disposed between two electrodes, namely a cathode and an anode. A solid polymer fuel cell is a specific type of fuel cell that employs a membrane electrode assembly ("MEA"), which comprises a solid polymer electrolyte or ion-exchange membrane disposed between the two electrode layers. An electrocatalyst is employed to induce the desired electrochemical reactions at the electrodes. The electrocatalyst is typically incorporated at the electrode/electrolyte interfaces. Flow field plates for directing the reactants across one surface of each electrode substrate are generally disposed on each side of the MEA. Solid polymer fuel cells typically operate in a range from about 40° C. to about 150° C.

A broad range of reactants has been contemplated for use in solid polymer fuel cells and such reactants may be delivered in gaseous or liquid streams. The oxidant may, for example, be substantially pure oxygen or a dilute oxygen stream such as air. The fuel stream may, for example, be substantially pure hydrogen gas, a gaseous hydrogen-containing reformate stream derived from a suitable feedstock, or a suitable gaseous or liquid organic fuel mixture. An advantage of liquid feedstocks and/or fuels, such as methanol, particularly in non-stationary applications, is that they are relatively easy to store and handle. Further, fuel mixtures that react directly at the anode in a direct liquid feed fuel cell avoid the use of a reformer in the fuel cell system.

A liquid feed fuel cell is a type of solid polymer fuel cell that operates using at least one liquid reactant stream. Most typically, liquid feed fuel cells operate directly on an organic liquid fuel stream typically supplied as a fuel/water vapor or as an aqueous fuel solution. Typically, methanol is used as the fuel in a liquid feed fuel cell though other organic fuels may be used such as, for example, ethanol or dimethyl ether. When methanol is used, the liquid feed fuel cell is often referred to as a direct methanol fuel cell (DMFC). The methanol in the fuel stream is directly oxidized at the anode therein. There is often a problem in DMFCs with crossover of methanol fuel from the anode to the cathode side through the membrane electrolyte. The methanol that crosses over typically reacts with oxidant at the cathode and cannot be recovered, resulting in significant fuel inefficiency and deterioration in fuel cell performance. To reduce crossover, dilute solutions of methanol, for example, 5% methanol in water, are typically used as fuel streams. The fuel streams in DMFCs are usually recirculated in order to remove carbon dioxide, a by-product of the reaction at the anode, and to re-use the diluent and any unreacted fuel in the depleted fuel stream exiting the DMFC. Methanol is added to the circulating fuel stream before it re-enters the fuel cell in order to compensate for the amount consumed, thereby providing a fresh mixture at the desired methanol concentration. Since the amount of methanol consumed is variable (depending on the load, crossover, and other operating parameters), the methanol concentration in the circulating fuel stream is usually measured continuously with a suitable sensor, and fresh methanol is admitted in accordance with the signal from the sensor.

Various types of sensors have been considered for purposes of measuring the concentration of methanol in aqueous solution and thus for use in a recirculating fuel stream in a liquid feed DMFC. For instance, electrochemical based sensors, which rely on the direct electro-oxidation of methanol in the fuel cell, may be considered. Advantages of electrochemical sensors include their simplicity, accuracy, fair reproducibility, and low-cost. However, electrochemical sensors suffer from degradation of the electrode reaction resulting in performance deterioration or failure over time.

Other types of sensors include capacitance devices that measure the change in dielectric constant of the fuel stream with methanol concentration. In theory, the larger the difference between the dielectric properties of two components of the fuel stream, the more precise the measurement can be. Unfortunately, the difference in dielectric constants for methanol-water systems is relatively small which may lead to misleading results or failure. Furthermore, the fuel in DMFCs is typically saturated with carbon dioxide, which may further exacerbate the difficulties in obtaining a precise measurement.

There are many factors to consider in developing a methanol sensor suitable for DMFCs. These factors include cost, size, simplicity, reliability, longevity, concentration range, and dynamic response. In particular, reliability and low cost should be addressed.

SUMMARY OF THE INVENTION

A liquid feed fuel cell system comprises a fuel cell stack having at least one fuel cell, a fuel delivery subsystem for providing a fuel stream to the fuel cell stack, and an oxidant delivery subsystem for providing an oxidant stream to the fuel cell stack. A method of measuring a fuel concentration in a fuel stream in such a fuel cell system comprises:

(a) measuring the temperature of the fuel stream entering the fuel cell stack;

(b) measuring a fuel cell stack temperature parameter indicative of the operating temperature of the fuel cell stack;

(c) measuring a current produced by the operating fuel cell system; and (d) calculating the concentration of fuel in the fuel stream based on the above measurements and a predetermined calibration of the fuel cell system.

Typically, the fuel will be methanol and the fuel cell system will thus be a DMFC though other fuels may be used. The fuel cell stack temperature parameter may be, for example, the temperature of a reactant, either the oxidant or the fuel, leaving the fuel cell stack.

This method allows the indirect measurement of concentration of fuel in an operating fuel cell without the use of a dedicated sensor. Fuel concentration in the fuel stream can be expressed as a function of the current, stack temperature, and fuel stream temperature. Naturally, the fuel cell system should be previously calibrated which can be accomplished using conventional empirical modeling techniques.

In another embodiment, the fuel and oxidant stoichiometries may also be maintained substantially constant. By maintaining the reactant stoichiometries, the empirical modeling and subsequent calculations of fuel concentrations are simplified. Otherwise, it may be desirous to include the effect of reactant flow rates in the modeling and subsequent calculations.

In a further embodiment, the fuel cell system is operated by calculating the concentration of fuel in a fuel stream as above and then adjusting the concentration of fuel to maintain the fuel concentration within a desired fuel concentration range.

The apparatus for implementing the method of operating the fuel cell includes a fuel stream temperature sensor for monitoring the temperature of the fuel stream entering the fuel cell stack, a fuel cell stack temperature sensor, and a current sensor. A controller, in communication with these sensors, is then able to calculate the concentration of fuel in the fuel stream. As a result of the calculation, the controller, which is also in communication with a fuel injector, may adjust the rate fuel is added to the fuel stream and thereby maintain the fuel concentration at a desired level.

DETAILED DESCRIPTION OF PREFERRED EMBODIMENT(S)

Figure 1:
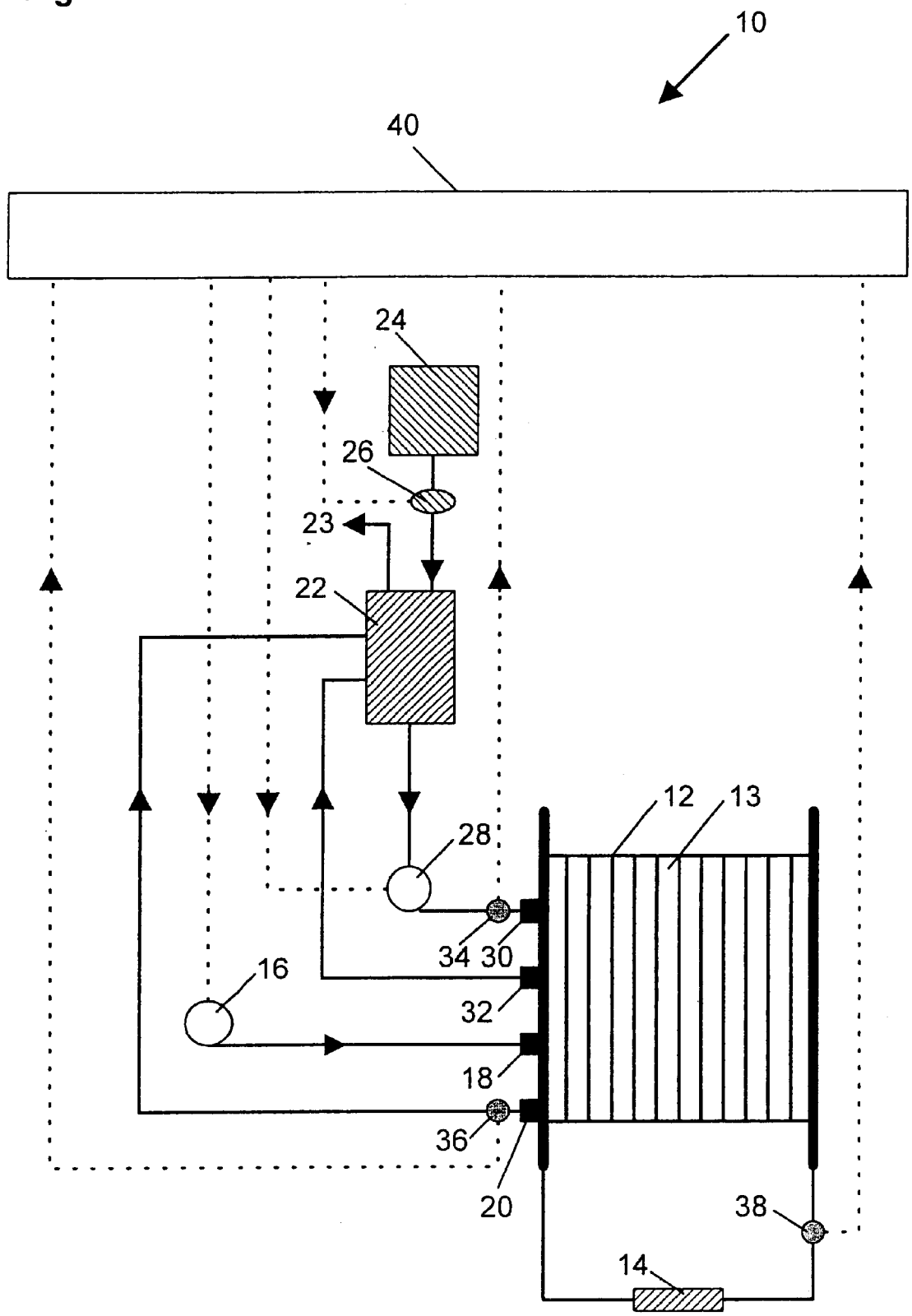
FIG. 1 is a simplified schematic of a liquid feed fuel cell system.

FIG. 1 is a simplified schematic of a liquid feed fuel cell system 10 comprising a fuel cell stack 12. Fuel cell stack 12 comprises a plurality of fuel cells 13 connected in series. Each fuel cell 13 comprises a cathode and an anode (not shown). Interposed between each anode and cathode is a polymer electrolyte membrane. Fuel can be directed to the anodes and oxidant can be directed to the cathodes.

The fuel typically used is methanol though other fuels such as, for example, ethanol or dimethyl ether could be used. A fuel tank 24 contains substantially pure fuel (not shown). Fluidly connected to fuel tank 24 is a fuel injector 26 that controls the rate of introduction of fuel into fuel mixer 22. Fuel mixer 22 dilutes the substantially pure fuel to obtain a dilute solution of fuel in water, suitable for use with fuel cell stack 12. Fuel pump 28 directs the dilute fuel solution from fuel mixer 22 to fuel cell stack 12 through fuel inlet manifold 30.

The fuel exhaust, namely excess fuel, water, and byproducts, such as carbon dioxide, may subsequently exit fuel cell stack 12 from fuel outlet manifold 32 back to fuel mixer 22 for recycling of the fuel and water. The carbon dioxide reaction product may be vented at vent 23 from fuel mixer 22, and additional fuel may be added by fuel injector 26 to adjust or substantially maintain the fuel concentration in fuel mixer 22.

The oxidant may be, for example, a dilute oxygen stream, such as air or substantially pure oxygen. In FIG. 1, air pump 16 delivers air to fuel stack 12 through oxidant manifold inlet 18. The cathode exhaust, namely the non-reactive components of air, the unreacted oxygen, and product water, exits fuel cell stack 12 at oxidant manifold outlet 20 and flows to fuel mixer 22 where the cathode exhaust, along with the carbon dioxide produced in the anode oxidation reaction, may vent at vent 23 to the external atmosphere. The product water may be captured by fuel mixer 22.

The delivery of fuel to the anodes and air to the cathodes produces an electric current which can be used with an external load 14.

A fuel stream temperature sensor 34 measures the temperature of the fuel stream entering fuel stack 12. A stack temperature sensor 36 measures the temperature of a parameter indicative of the internal temperature of fuel cell stack 12. In FIG. 1, stack temperature sensor 36 measures the temperature of the oxidant stream exiting the fuel cell stack though other parameters could be measured, such as, for example, the temperature of the fuel stream exiting the fuel cell stack or some other parameter. A current sensor 38 measures the current produced by operating fuel cell stack 12.

Controller 40 receives the temperature of the inlet fuel stream ($T_F$) from fuel stream temperature sensor 34, the temperature of the stack ($T_S$) from stack temperature sensor 36, and the current (I) generated by operating fuel cell stack 12 from current sensor 38. In any particular fuel cell stack, we have discovered that the concentration of fuel ($C_M$) can be expressed as a function of fuel stream temperature, stack temperature, and current. Each fuel cell system will differ on the precise relationship between $C_M$, $T_F$, $T_S$, and I. However, once controller 40 is properly calibrated for the particular fuel cell system 10, controller 40 may calculate the concentration of fuel in the fuel stream based on the measured values of $T_F$, $T_S$, and I.

In calculating $C_M$, the flow rates of the fuel and oxidant streams may also be considered. The fuel and oxidant stream flow rates affect the stack temperature as heat generated by the stack may be removed by fuel exhaust and cathode exhaust. The greater the reactant flow rate, the greater the removal of heat in the reactant exhaust. However, to simplify the calculations of $C_M$, the oxidant flow rate ($R_{OX}$), and the fuel flow rate ($R_F$) can be controlled as a function of the current. This can be expressed as:

$$R_{OX}=A_1I^2+A_2I+A_3 \text{ and}$$

$$R_F=B_1I^2+B_2I+B_3,$$

where $A_1$, $A_2$, and $A_3$ and $B_1$, $B_2$, and $B_3$ are constants related to air and fuel stoichiometries, respectively. Stoichiometry refers to the ratio of reactant supplied to the fuel cell over reactant consumed by the fuel cell. Thus, for a given reactant stoichiometry, the flow rates are determined by the current.

Figure 2:
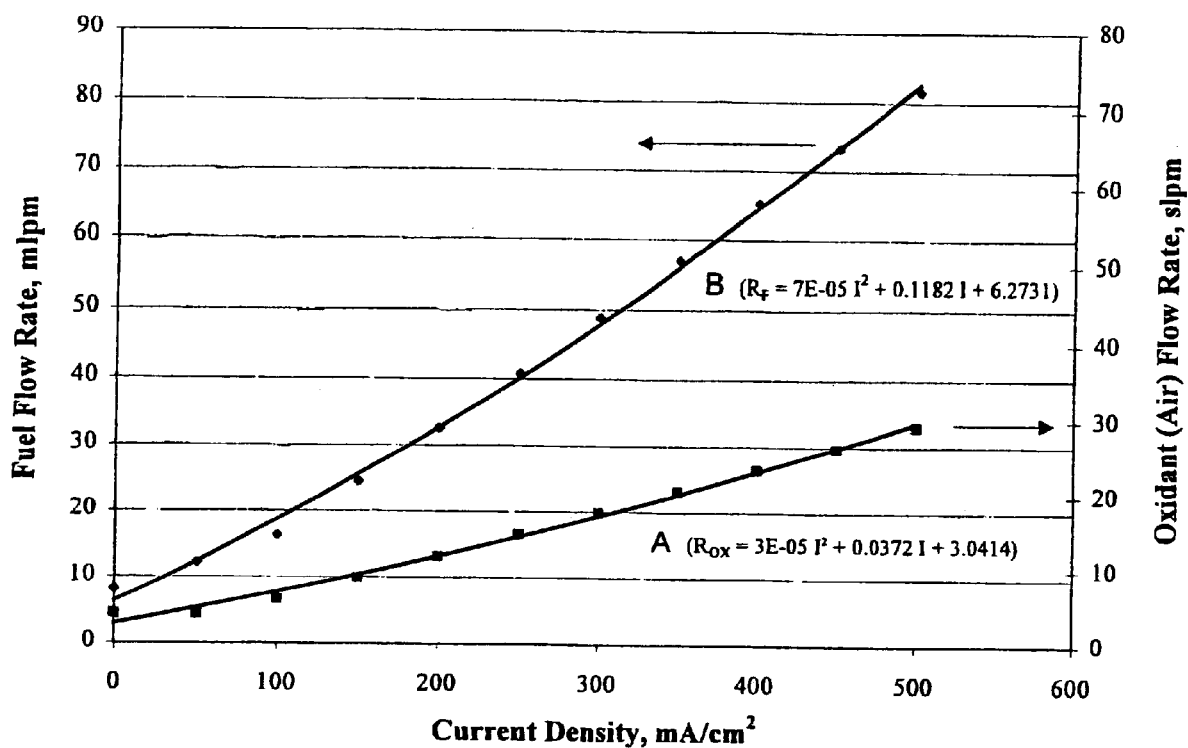
FIG. 2 graphically illustrates the relationship between reactant flow rate and current density.

FIG. 2 illustrates experimental results showing the relationship between reactant flow rate and current density for a Ballard® DMFC 10-cell stack with 118 cm² of active area per cell. Air stoichiometry was maintained at 3.0, fuel stoichiometry was 2.0 with a methanol concentration of 1.5M. The curve represented by A illustrates the variation of air flow rate with current density, whereas the curve represented by B illustrates the variation of fuel flow rate with current density. The following expressions were thus derived relating reactant flow rates to current density:

$$R_{OX}=3\times10^{-5}I^2+0.0372I+3.0414 \text{ and}$$

$$R_F=7\times10^{-5}I^2+0.1182I+6.2731.$$

If the flow rates are adjusted to maintain substantially constant reactant stoichiometries, the flow rate need not be explicitly considered in the calculation of $C_M$ as it is inherently reflected in the measurement of the current.

The control of the fuel and airflow rates according to the observed current thus simplifies the calculation of fuel concentration $C_M$. Such control can be exercised by controller 40 in FIG. 1 in response to the current measured by current sensor 38. This is shown by dashed lines from controller 40 to air pump 16 and fuel pump 28.

As a result of the measurement of stack temperature, fuel stream temperature, and current, the concentration of fuel in the fuel stream entering fuel cell stack 12 can be calculated by controller 40. If the concentration of the fuel varies from a desired value, controller 40 can adjust the concentration of fuel in fuel mixer 22 by either increasing or decreasing the rate at which fuel injector 26 introduces substantially pure fuel to fuel mixer 22.

A disadvantage of this method for measuring fuel concentration is that there is typically a response time of as much as thirty seconds in the current density range of 0–100 mA/cm$^2$, and as much as ten seconds at 100–500 mA/cm$^2$ for the stack temperature to reflect a changing methanol concentration. Fortunately, the methanol working concentration is broad, typically 1.3–2.1 M. This wide working concentration range provides a significant tolerance for concentration control. Even if the stack temperature response to the concentration change is relatively slow, it is acceptable for DMFC applications to maintain the concentration within the working concentration range.

The response time may also affect the accuracy of the calculations. As mentioned above, the fuel stoichiometries can be maintained substantially constant so as to simplify the calculations. With longer response times, it becomes more difficult to maintain the fuel stoichiometry substantially constant and errors in the calculation may result. However, this is not expected to significantly affect the sensing result.

Significant advantages include cost and reliability. Conventional DMFC systems already measure current and fuel and stack temperatures. Thus, an additional sensor need not be employed to measure methanol concentration. Fewer sensors reduces the overall cost and complexity of the fuel cell system. Furthermore, temperature and current sensors tend to be both reliable and durable such that sensing degradation is not likely to occur over the lifetime of the fuel cell system.

EXAMPLE

A fuel cell system was constructed as generally depicted in FIG. 1. A Ballard® DMFC 10-cell stack was used with a 118 cm$^2$ active area per cell. The cathodes were prepared using TGP-H-060 (6% PTFE) with approximately 0.6 mg/cm$^2$ carbon base and 3.5 mg/cm$^2$ loading of platinum black catalyst. The anodes were prepared using TGP-H-060 with approximately 4.0 mg/cm$^2$ platinum/ruthenium black catalyst. The membrane electrolyte employed was Nafion™ 115. Bipolar graphite flow field plates were used.

For calibration purposes, methanol fuel solutions with concentrations of 1.33, 1.56, 1.78, and 2.04 M were prepared with Optima™ grade methanol obtained from Fisher Scientific Company L.L.C. and de-ionized water. Air was used as the oxidant. A DMFC test station was employed to control the fuel stream temperature ($T_F$), the stack current load (I), and the corresponding air and fuel flow rates. A multimeter and two thermocouples were used to measure the stack voltage, $T_F$, and the stack temperature ($T_S$). Stack voltage was measured to ensure that the stack was in normal working order.

Figure 3:
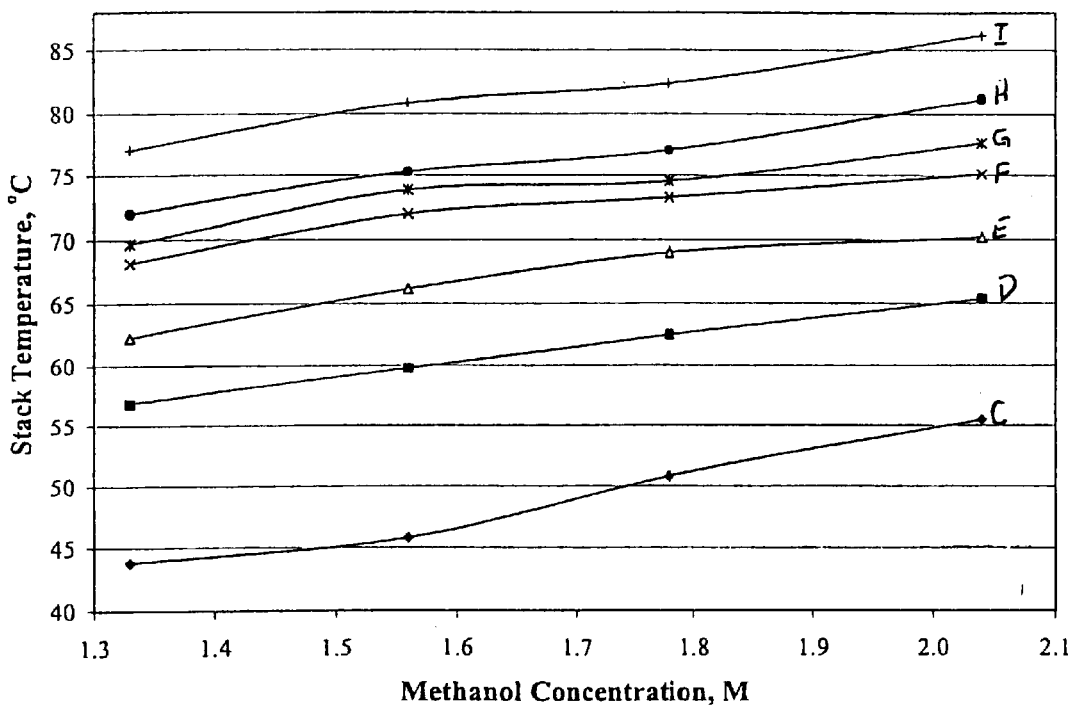
FIG. 3 graphically illustrates the relationship between fuel cell stack temperature and fuel concentration.

FIG. 3 illustrates the relationship between stack temperature and methanol concentration at approximately 60° C. fuel stream temperature at various controlled current densities. Air stoichiometry was 3.0 and fuel stoichiometry was 2.0 at 1.5 M methanol at all current densities, except at the open circuit potential. C represents the results obtained at a current density of 0 mA/cm$^2$, whereas D is at 50 mA/cm$^2$, E is at 100 mA/cm$^2$, F is at 200 mA/cm$^2$, G is at 300 mA/cm$^2$, H is at 400 mA/cm$^2$, and I is at 500 mA/cm$^2$. A monotonic trend of increasing stack temperature with increasing methanol concentration and current density is observed.

Figure 4:
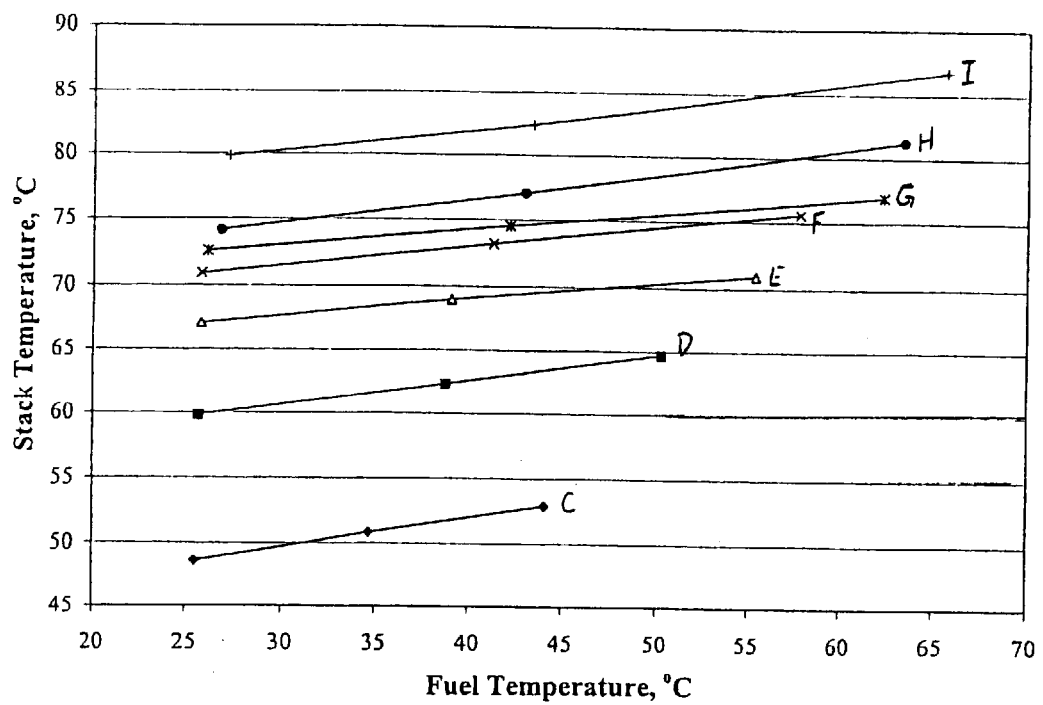
FIG. 4 graphically illustrates the relationship between fuel cell stack temperature and fuel stream temperature.

A similar relationship is seen in FIG. 4, which illustrates stack temperature against fuel stream temperature. Air stoichiometry was 3.0 and fuel stoichiometry was 2.0 with a methanol concentration of 1.78 M. The lettering scheme, C-I represents the same current densities as in FIG. 3. The relationship between stack temperature and fuel stream temperature is close to being linear.

Figure 5:
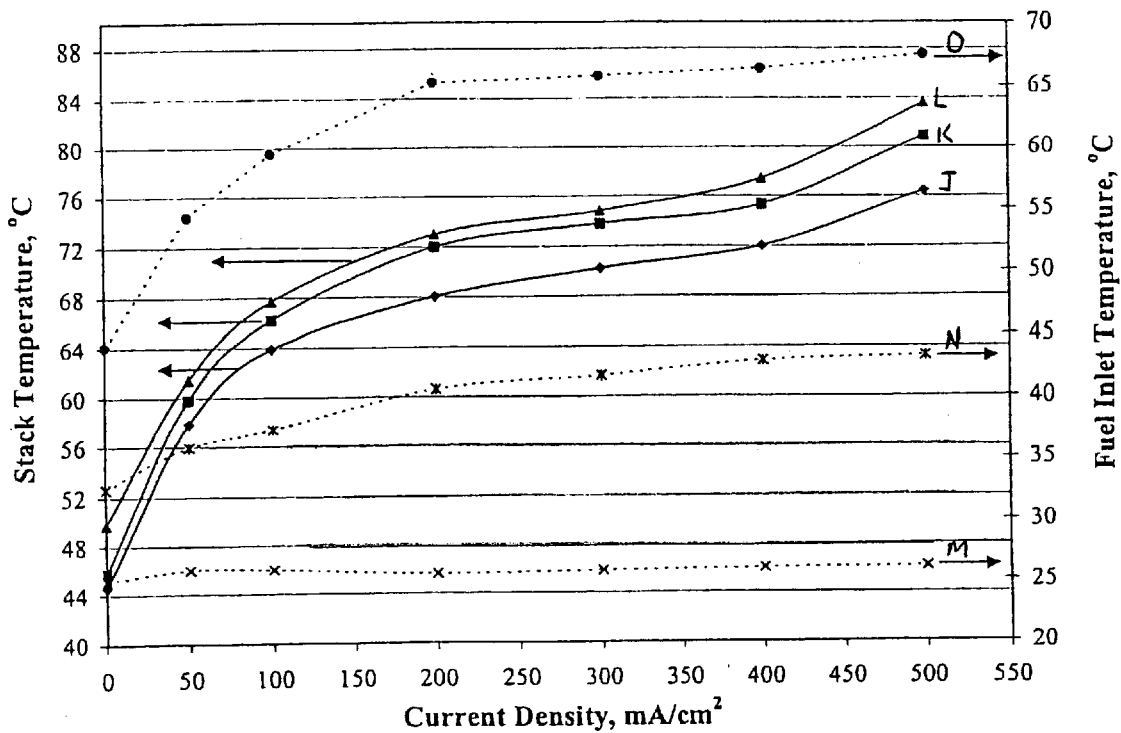
FIG. 5 graphically illustrates the relationships between fuel cell stack temperature and current density and between fuel stream temperature and current density.

FIG. 5 illustrates the relationship between both stack temperature and fuel stream temperature with current density. Air stoichiometry was maintained at 3.0 and fuel stoichiometry was maintained at 2.0 with a methanol concentration of 1.56 M. J, K, and L represent the stack temperatures obtained at various current densities at fuel stream temperatures of approximately 25, 40, and 60° C., respectively. M, N, and O represent the fuel stream temperatures obtained at various current densities at stack temperatures of approximately 25, 40, and 60° C., respectively. While the relationships are more complicated than observed in FIGS. 3 and 4, the trend is still monotonic. Collectively, FIGS. 3–5 indicate the viability of methanol concentration sensing through stack temperature, fuel stream temperature, and current.

Empirical modeling was then employed to determine a mathematical expression relating methanol concentration ($C_M$) to stack temperature ($T_S$), fuel stream temperature ($T_F$), and current (I). A total of eighty-four data points were collected for modeling purposes and each point contained four variables, namely $C_M$, $T_F$, $T_S$, and I. These variables were collected at four methanol concentrations, namely 1.33, 1.56, 1.78, and 2.04 M; seven output currents namely 0, 50, 100, 200, 300, 400, and 500 mA/cm2; and three fuel stream temperatures namely 25, 40, and 60° C.

Empirical modeling of all eighty-four data points resulted in the following expression for the particular fuel cell system tested:

$$C_M = 0.0641 T_S - 0.0126 T_F - 0.000000516 I^3 + 0.0000464 I^2 - 0.0140 I - 1.089.$$

The typical error range was found to be 0.05–0.1M which is believed to be an acceptable error range for DMFC applications.

It is understood that the fuel cell system could be calibrated to calculate a value for the fuel concentration that is only proportional to the true concentration. This is not significant if the system is properly calibrated to appropriately adjust the rate of fuel injection into the fuel stream.

While particular steps, elements, embodiments, and applications of the present invention have been shown and described, it will be understood, of course, that the invention is not limited thereto since modifications may be made by persons skilled in the art, particularly in light of the foregoing teachings. It is therefore contemplated by the appended claims to cover such modifications as incorporate those steps or elements that come within the scope of the invention.

What is claimed is:

1. A method of measuring a fuel concentration in a fuel stream supplied to an operating liquid feed fuel cell system, the system comprising a fuel cell stack having at least one fuel cell, a fuel delivery subsystem for providing the fuel stream to the fuel cell stack, and an oxidant delivery subsystem for providing an oxidant stream to the fuel cell stack, the method comprising:
   (a) measuring a temperature of the fuel stream entering the fuel cell stack;
   (b) measuring a fuel cell stack temperature parameter indicative of the operating temperature in the fuel cell stack;
   (c) measuring a current produced by the operating fuel cell system; and
   (d) calculating the concentration of fuel in the fuel stream based on the measured fuel stream temperature, fuel cell stack temperature parameter, and current, the calculation also based on a predetermined calibration of the fuel cell system.

2. The method of claim 1 wherein the fuel is methanol.

3. The method of claim 1 wherein the fuel cell stack temperature parameter is the temperature of the oxidant stream exiting the fuel cell stack.

4. The method of claim 1 wherein the fuel cell stack temperature parameter is the temperature of the fuel stream exiting the fuel cell stack.

5. The method of claim 1 further comprising:
   (e) maintaining a substantially constant fuel stoichiometry; and
   (f) maintaining a substantially constant oxidant stoichiometry.

6. A method of operating a liquid feed fuel cell system, the system comprising a fuel cell stack having at least one fuel cell, a fuel delivery subsystem for providing a fuel stream to the fuel cell stack within a desired fuel concentration range, and an oxidant delivery subsystem for providing an oxidant stream to the fuel cell stack, the method comprising:
   (a) measuring a temperature of the fuel stream entering the fuel cell stack;
   (b) measuring a fuel cell stack temperature parameter indicative of the operating temperature in the fuel cell stack;
   (c) measuring a current produced by the operating fuel cell system;
   (d) calculating a concentration of fuel in the fuel stream based on the measured fuel stream temperature, fuel cell stack temperature parameter and current, the calculation also based on a predetermined calibration of the fuel cell system; and
   (e) adjusting the rate of fuel added to the fuel stream to maintain the fuel concentration within the desired fuel concentration range.

7. The method of claim 6 wherein the fuel is methanol.

8. The method of claim 6 wherein the fuel cell stack temperature parameter is the temperature of the oxidant stream exiting the fuel cell stack.

9. The method of claim 6 wherein the fuel cell stack temperature parameter is the temperature of the fuel stream exiting the fuel cell stack.

10. The method of claim 6 further comprising:
    (f) maintaining a substantially constant fuel stoichiometry; and
    (g) maintaining a substantially constant oxidant stoichiometry.

11. A liquid feed fuel cell system comprising:
    (a) a fuel cell stack comprising at least one fuel cell;
    (b) a liquid fuel supply subsystem fluidly connected to the stack for supplying a fuel stream to the stack, the fuel supply subsystem comprising a fuel injector for adding fuel to the fuel stream and a fuel stream temperature sensor for monitoring the temperature of the fuel stream entering the stack;
    (c) an oxidant supply subsystem fluidly connected to the stack for supplying an oxidant stream to the stack;
    (d) a fuel cell stack temperature sensor associated with the fuel cell stack;
    (e) a current sensor associated with the fuel cell stack; and
    (f) a controller in communication with the fuel stream temperature sensor, the stack temperature sensor, and the current sensor for receiving and processing signals from the fuel stream temperature sensor, the stack temperature sensor, and the current sensor to calculate the concentration of fuel in the fuel stream, wherein the controller is in communication with the fuel injector to maintain the fuel concentration within a desired fuel concentration range.

12. The fuel cell system of claim 11 wherein the fuel is methanol.

13. The fuel cell system of claim 11 wherein the stack temperature sensor measures the temperature of the oxidant stream exiting the stack.

14. The fuel cell system of claim 11 wherein the stack temperature sensor measures the temperature of the fuel stream exiting the stack.

15. A liquid feed fuel cell system comprising:
    (a) a fuel cell stack comprising at least one fuel cell;
    (b) a liquid fuel supply subsystem fluidly connected to the stack for supplying a fuel stream to the stack, the fuel supply subsystem comprising a fuel injector for adding fuel to the fuel stream;
    (c) an oxidant supply subsystem fluidly connected to the stack for supplying an oxidant stream to the stack;
    (d) a fuel concentration sensor subsystem consisting essentially of:
        (1) a fuel stream temperature sensor for monitoring the temperature of the fuel stream entering the stack;
        (2) a fuel cell stack temperature sensor;
        (3) a current sensor; and
        (4) a controller in communication with the fuel stream temperature sensor, the fuel cell stack temperature sensor, and the current sensor for receiving and calculating the concentration of fuel in the fuel stream.

* * * * *